(12) United States Patent
Plourde (10) Patent No.: US 7,681,679 B2
(45) Date of Patent: Mar. 23, 2010

(54) CANTILEVERED MOTORCYCLE FRAME

(76) Inventor: Scott Plourde, 110 S. Willow St., Suite 9, Manchester, NH (US) 03103

( * ) Notice: Subject to any disclaimer, the term of this patent is extended or adjusted under 35 U.S.C. 154(b) by 769 days.

(21) Appl. No.: 11/342,488

(22) Filed: Jan. 30, 2006

(65) Prior Publication Data

US 2007/0175689 A1 Aug. 2, 2007

(51) Int. Cl.
*B62D 61/02* (2006.01)
(52) U.S. Cl. ................... 180/219; 180/227
(58) Field of Classification Search ............ 280/219, 280/227

See application file for complete search history.

(56) References Cited

U.S. PATENT DOCUMENTS

| | | | |
|---|---|---|---|
| 4,427,087 A * | 1/1984 | Inoue et al. ............ | 180/219 |
| 5,016,725 A | 5/1991 | Muramatsu | |
| 5,480,001 A * | 1/1996 | Hara ..................... | 180/227 |
| 5,845,728 A | 12/1998 | Itoh et al. | |
| 6,644,437 B1 | 11/2003 | Hayman | |
| 6,736,230 B2 | 5/2004 | Yokomizo | |
| D496,886 S * | 10/2004 | Everett et al. .......... | D12/117 |
| D498,708 S * | 11/2004 | James ................. | D12/110 |
| 6,846,018 B2 * | 1/2005 | Dennert et al. ......... | 280/785 |
| D204,358 S | 4/2005 | Miller, Jr. et al. | |

* cited by examiner

*Primary Examiner*—Lesley Morris
*Assistant Examiner*—Marlon A Arce
(74) *Attorney, Agent, or Firm*—Daniels Patent Law PLLC; Scott A. Daniels (57) ABSTRACT

A motorcycle frame assembly having a cantilevered, open loop motorcycle frame assembly that achieves a desirable balance between frame strength and rigidity in a lateral and a vertical direction without the necessity of a conventional down tube. The frame assembly utilizes a top tube supported by a top tube support aligned parallel and concentric with at least a portion of the top tube from a connection point with the head tube. The top tube and support being the sole support for the head tube so that a down tube is not necessary.

15 Claims, 13 Drawing Sheets

CANTILEVERED MOTORCYCLE FRAME

FIELD OF THE INVENTION

The present invention relates generally to motorcycle frame assemblies and, more particularly, to a cantilevered, open loop motorcycle frame assembly that achieves a desirable balance between frame strength and rigidity in a lateral and a vertical direction without the necessity of a conventional down tube.

BACKGROUND OF THE INVENTION

As is well known, motorcycles are generally built upon and around a frame assembly that is made up of a plurality of individual tubes welded together. The typical frame construction includes a head pipe at a front end of the frame, which desirably supports the front wheel via a front fork assembly which is steerable by an attached handle bar(s). A main tube, or tubes, typically extend generally rearwardly from the head pipe and may bend downward over a rear portion of an engine that is positioned generally below the main tube.

In addition, one or more down tubes are typically affixed at their forward ends to the head pipe at a location lower than the main tubes. The down tubes extend downwardly and rearwardly from the head pipe. The rear ends of the main tube and the down tubes generally are joined, frequently by a pair of seat rails and bracket assemblies. The bracket assemblies typically provides support for the rear wheel suspension swing arm assembly. Although the arrangement of the individual frame members may vary, the above-described construction is generally the type utilized for motorcycles for both on and off-road motorcycles.

In the case of lateral loads applied to a motorcycle, rigidity is desired to improve stability during cornering at high speeds or over rough terrain. In the case of the vertical loads, the motorcycle must absorb certain vertical shock loads applied to the frame. If the frame is too rigid, the shock loads are largely transferred to the rider. If the frame is not rigid enough, the frame may elastically deform or break.

A certain frame for motorcycles having a single, rectangular cross-section main tube are disclosed, for example, in Itoh et al, U.S. Pat. No. 5,845,728. This frame includes a down tube provided for supporting a forward part of the engine extending downward from the head tube. It is clear from the description and the drawings of this reference that the down tube does not directly connect with another part of the frame, but does connect directly to the engine for support thereof and also that the single main tube of the frame is rectangular or elliptic in cross-section, or in other words, transversely elongate in cross-section.

SUMMARY OF THE INVENTION

It is an object of the present invention to provide a construction of a motorcycle frame having a high rigidity capable of withstanding transverse bending and torsional forces as well as vertical forces applied to the frame during on and off-road riding.

It is another object of the invention to provide a motorcycle frame without a down tube which is capable of withstanding transverse bending and torsional forces as well as vertical forces applied to the frame during on and off-road riding.

It is a still further object of the invention to provide a top tube for a motorcycle frame which is s- shaped and cantilevered over the engine to support the head tube, front wheel and steering assembly of the motorcycle.

Even another object of the present invention is to apply an air damped rear suspension which provides the classic appearance of a rigid, hard-tail motorcycle frame while still permitting substantial flexing between the top tube and rear swing arm assembly of the motorcycle.

Other objects of the invention include a novel single arm swing arm for supporting the rear wheel of the motorcycle relative to the frame assembly, and also components for a conventional double arm swing arm which facilitate mounting of an entire wheel assembly on the swing arm in a single step.

With the foregoing objects in view, the present invention provides a frame for a motorcycle, including at least a top tube extending over an engine from a head pipe for pivotally supporting a front fork. The top tube is curved so as to extend over and downwardly behind the engine to provide a drop seat very low and close to the frame rails. The top tube connects to a rear swing arm support bracket which defines a pivot axis about which a rear swing arm for supporting a rear wheel is rotatably connected. The top tube is generally comprised of easily obtainable tube stock and extends in a vertical plane defining the longitudinal axis of the motorcycle and is cantilevered out over the engine from the connection points behind the engine.

The motorcycle frame includes the top tube supported by at least another support tube having a smaller radius than that of the top tube and welded to a lower portion of the top tube in a substantially parallel and concentric arrangement from the head tube to a point where the top tube diverges from the support tube to respectively form a drop seat and an engine support of the motorcycle. Therefore, the motorcycle frame has a generally planar construction that can be easily worked and a provide the necessary rigidity capable of withstanding transverse bending as well as torsional and vertical forces.

Secondly, the top tube defines a drop seat rail for supporting a seat, connected to the rear portion of the top tube at point vertically closer to the bottom frame rails than the upper most, or crown portion of the top tube. One end of the top tube connects to the rear swing arm support to define the cantilevered top tube extending in a vertical plane along the longitudinal axis of the motorcycle, the frame including the seat rail has a simple planar framing and has a high rigidity capable of withstanding transverse bending, vertical and torsional forces.

Thirdly, the body frame further includes at least a support tube(s) for providing reinforcement to the top tube and supporting the engine at a back end. The support tube(s) are connected to the main pipe from the head tube and extend rearward therefrom, separating from the top tube adjacent the drop seat. The support tube(s) extend downwardly in a substantially vertical plane to attach to the lower frame rails at a point rearward of the motorcycle engine.

The motorcycle frame also includes the rear swing arm pivot axis which can support either a rear single swing arm, or a conventional double arm swing arm for supporting the rear wheel. In either event the swing arm is damped and variably displaced by an air cushion controlled by a pneumatic pump. In addition, the double swing arm assembly is provided with a pair of rear axle supports which permit the mounting of a complete rear wheel assembly in a single step including at least the wheel, axle brake rotors and spacers being inserted as a completed assembly directly between the rear axle supports and bolted thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

The invention will now be described, by way of example, with reference to the accompanying drawings in which.

DETAILED DESCRIPTION OF THE INVENTION

Figure 1A:
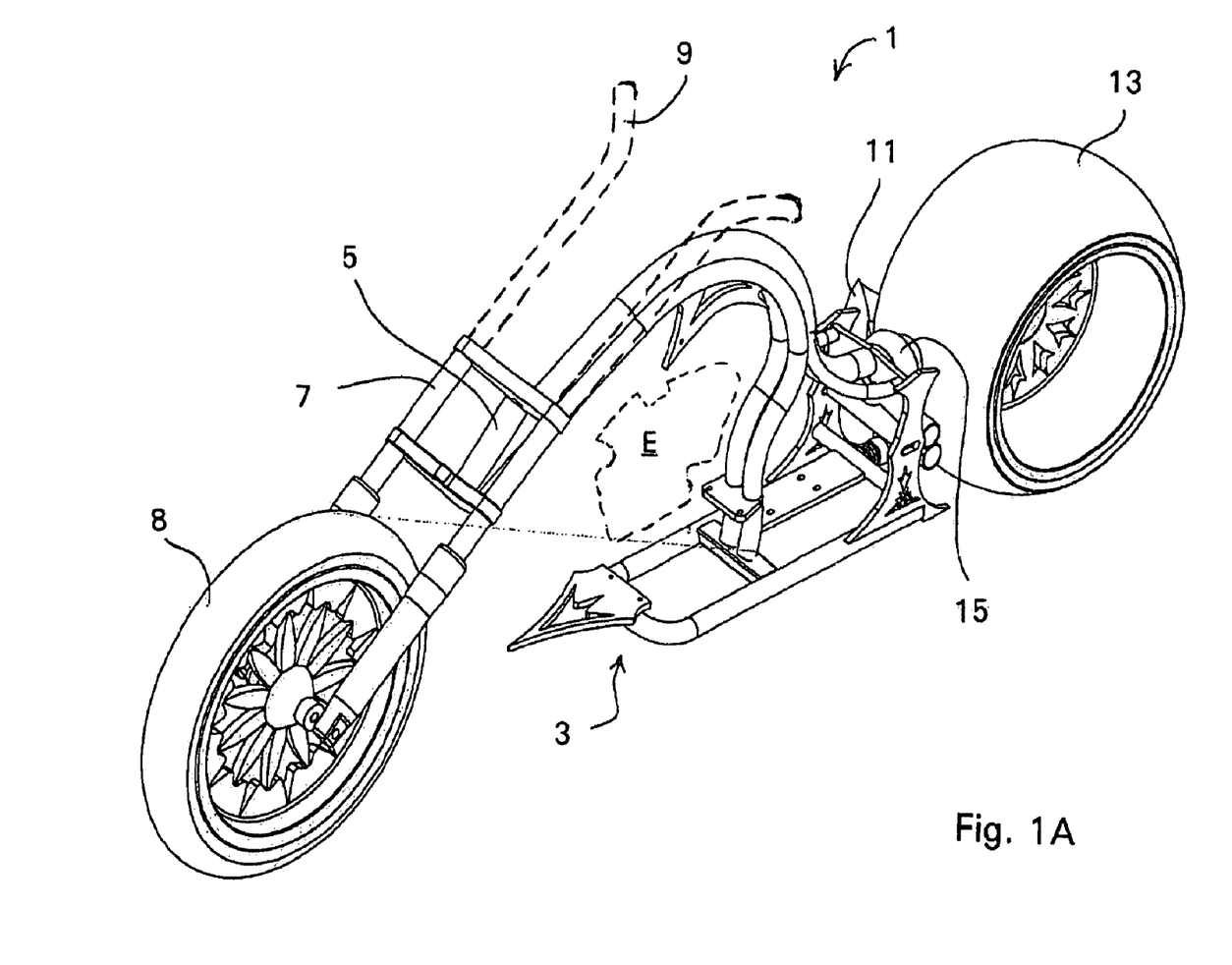
FIG. 1A is a perspective view of a motorcycle, including a frame constructed in accordance with an embodiment of the present invention.
Figures 1B, 1C:
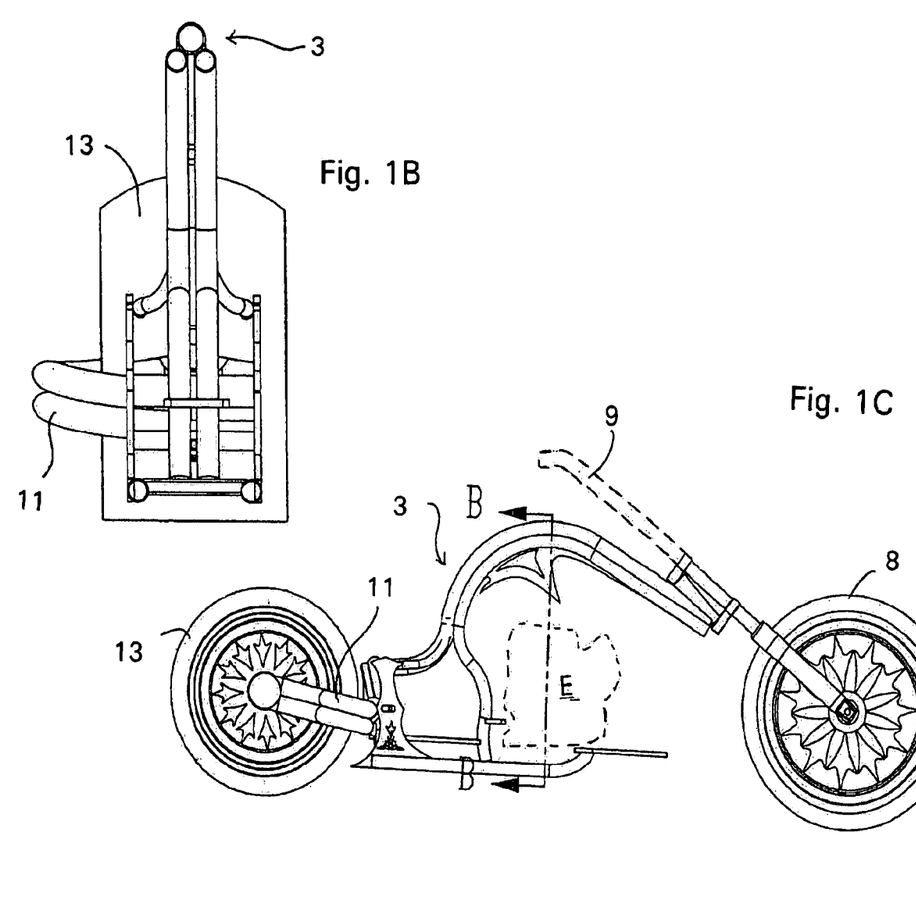
FIG. 1B is a cross-section view through the frame assembly of the motorcycle, including a frame constructed in accordance with an embodiment of the present invention.
FIG. 1C is a side elevational view of a motorcycle, including a frame constructed in accordance with an embodiment of the present invention.

Referring now in detail to the drawings and initially to FIGS. 1A-C, a motorcycle constructed in accordance with an embodiment of the invention is identified generally by the reference numeral 1. The motorcycle 1 is designed primarily for on-road type use. Although the invention is described in conjunction with a motorcycle for such utilization, it is to be understood that certain facets of the invention can be employed in conjunction with motorcycles used for other purposes, for example off-road riding. However, the invention has particular utility in conjunction with on-road motorcycles.

By way of a general introduction, the motorcycle 1 includes a frame assembly 3 which is of the welded up, fabricated type. The frame assembly 3 includes a head tube 5 that journals a front fork assembly 7 for steering movement. A front wheel 8 is rotatably attached at the lower end of the front fork 7 by means which may include a suspension system of a known type. A handlebar assembly 9 is provided forwardly of a gas tank and attached to an upper end of the front fork 7 for steering of the forks and front wheel 8 in a known manner. A front fender assembly may, or may not be affixed to the front fork 7 above the wheel 8.

A rear swing arm 11 is pivotally supported by a rear portion of the frame 3 about a pivot axle defining a rear pivot axis. The swing arm assembly 11 may be either a single or a conventional double, arm-type, both of which will be explained in further detail below. A rear wheel 13 is supported by the swing arm assembly 11 and is driven by either a belt or chain drive, in a manner known in the art for powering the motorcycle 1.

An air damped shock absorber 15, which is regulated by a pneumatic pump, is inserted between the rear swing arm 11 and the motorcycle frame 3 for controlling relative movement between the rear swing arm 11 and the frame 3. The air damped shock absorber 15 provides the dual capability of cushioning the relative displacement of the frame 3 and swing arm 11 generally occurring during travel for example over a rough road surface, and also providing a variable angular orientation between the rear swing arm 11 and the frame 3 so as to permit the raising and lowering of the frame 3 itself relative to the ground.

An internal combustion engine E is supported by the frame assembly 3 by way of a floating engine mount, i.e., the engine mount is not supported by a conventional downtube. Although the invention can be employed with engines having any number of cylinders, the invention has particular utility in conjunction with 2-cylinder engines wherein the cylinder block is inclined from the vertical toward the front and extends only slightly upwardly from a horizontally extending plane. Also, although the invention is described in conjunction with a 4-cycle crankcase, compression-type engine, certain facets of the invention may also be employed with engines operating other than on the four-cycle principal.

As is conventional in motorcycle practice, the engine E is connected to a combined crankcase, change speed transmission (not shown) that contains a plurality of gearsets that are driven from the engine crankshaft and which drive an output shaft. A sprocket (not shown) is affixed for rotation with this output shaft, which is also coincident with the pivot axis of the rear swing arm 11 and drives a chain or belt which, in turn, drive a sprocket (also not shown) affixed to the rear wheel assembly 13 in a known manner. A further detailed description of certain aspects of the aforementioned motorcycle frame 3 is provided below.

The construction of the frame assembly 3 will now be described in further reference to FIGS. 2-6. Of course, certain components of the frame 3 are shown in other of the Figures, but the general overall frame construction can be best understood by reference primarily to the noted Figures. The frame assembly 3 is comprised of a top tube 21 formed substantially in an S-shape defined by a forward portion 23 of the top tube 21 which, in general, arcs forwardly from an intermediate transition portion 25 and connects to the head tube 5 which supports the front forks 7, wheel 8 and handlebar 9, as discussed above. A rear portion 27 of the top tube 21 arcs rearwardly from the intermediate transition portion 25 in an oppositely curved manner to that of the forward portion 23 and connects to a transverse rear support 47 of the frame 3 to define a drop seat position 31 on the frame 3.

Figure 3:
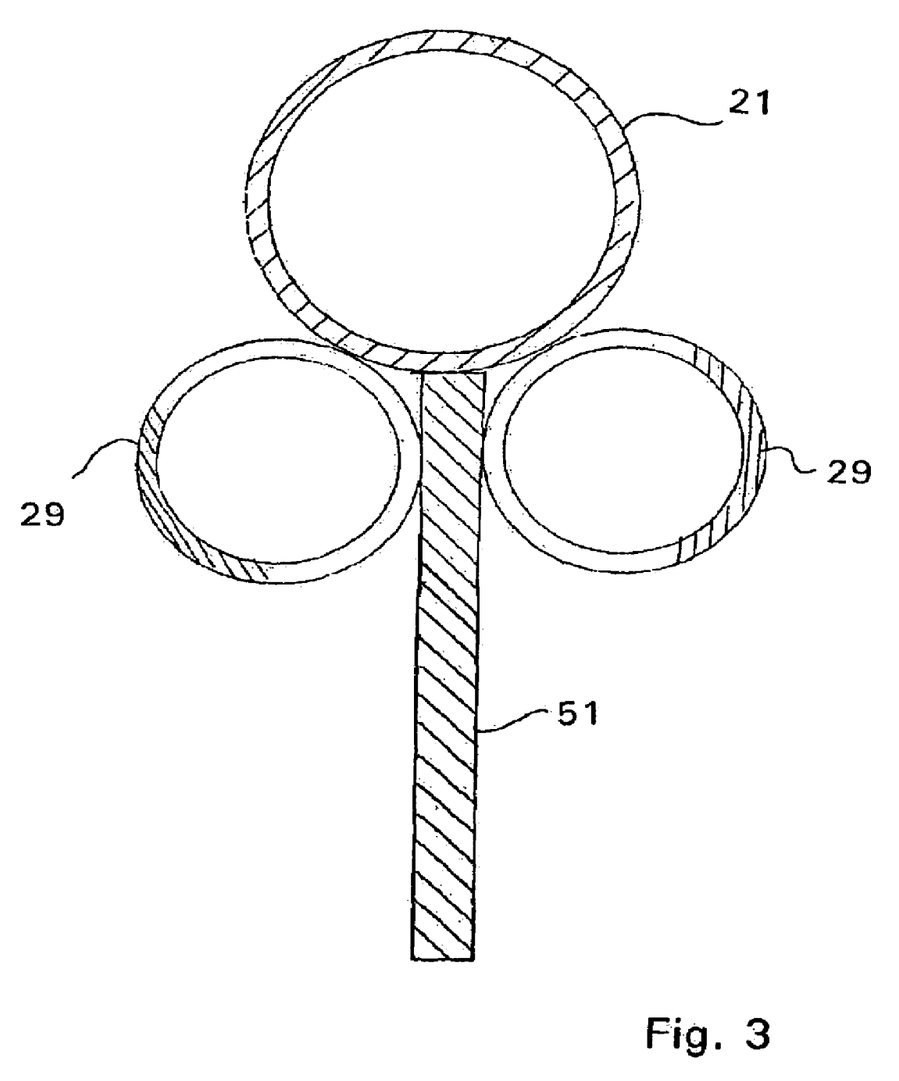
FIG. 3 is a cross-sectional view of the elements making up the open looped motorcycle frame according to the present invention.

The top tube 21 is generally a single, contiguous tube having a conventional circular cross-section shown in FIG. 3 and as is readily and inexpensively available in the market. The top tube 21 may be formed from conventional steel tube stock, as well as other lighter-weight materials such as aluminum or an aluminum alloy. It is conceivable that certain other cross-sectional shapes of tube stock, such as elliptical, square or rectangular, could be used as well, but where round tube stock is readily available, economical and most easily fabricated into the S-shape, such round tube stock is preferable.

Returning to FIG. 2, the top tube 21 is partially supported by one or more supports, generally but not necessarily support tubes 29, connected along the length of the forward portion 23 of the top tube 21. The support or support tubes 29 are substantially in parallel contact with, and are concentrically curved relative to the top tube 21, although having a smaller radius than the top tube, so as to directly support at least the forward portion 23 of the top tube 21. The direct support could be an intermittent or a continuous contact by any attachment means as known in the art, for instance welds, clamps or bolting, could be used to connect the top tube 21 and support tubes 29. The support tube or tubes 29 diverge from their parallel and concentric support of the top tube 21 about the intermediate transition portion 25 of the top tube 21 and extend generally downward to attach to a lower portion of the frame 3 adjacent the bottom rails 33.

Figure 2:
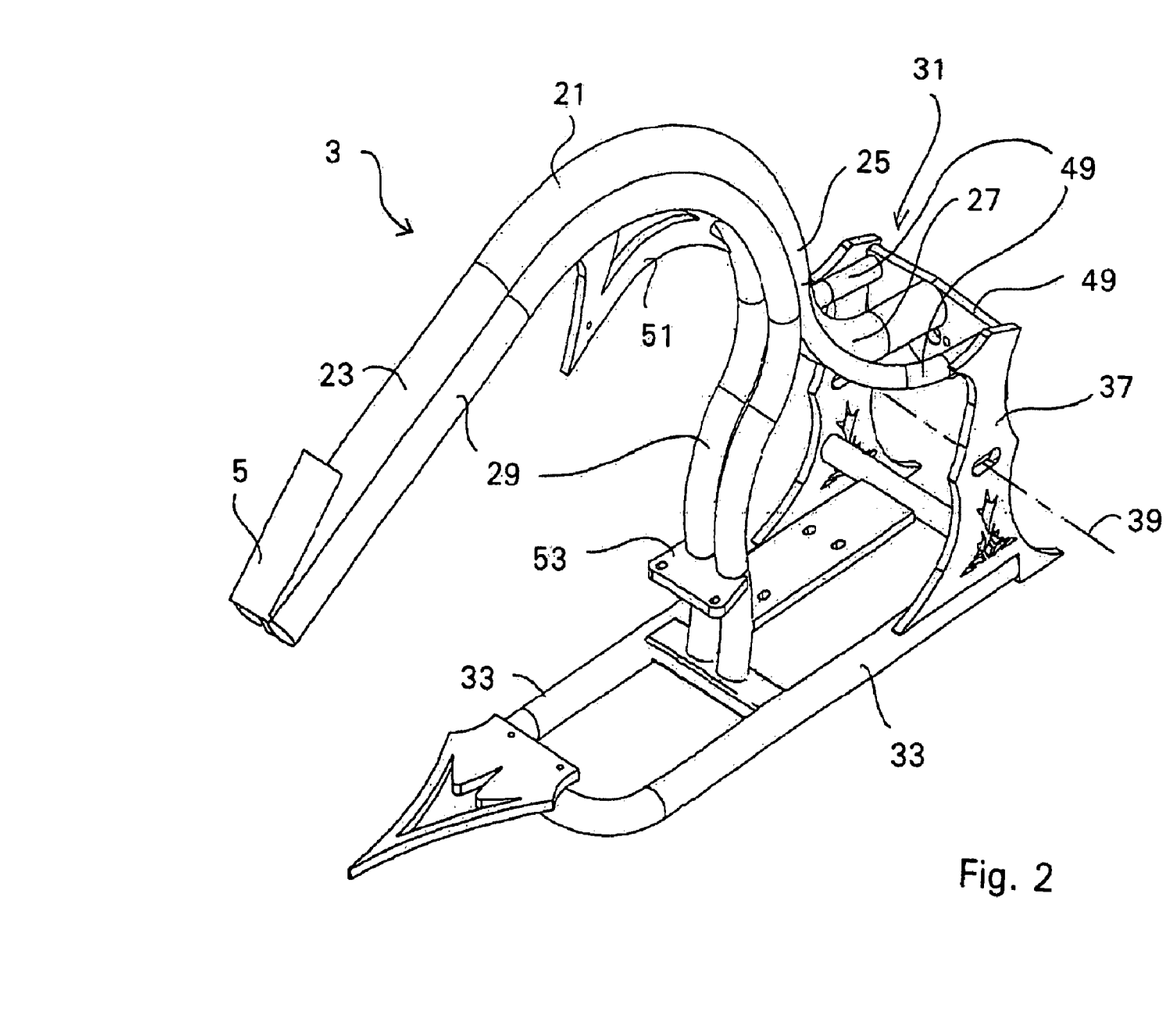
FIG. 2 is a perspective view of the motorcycle frame constructed in accordance with an embodiment of the present invention.

The support tubes 29 provide both vertical and torsional strength to the top tube 21. This structure is an important part of the present invention because without a down tube, the forward portion 23 of the top tube is essentially a cantilevered member extending out over the engine mount 43 and thus, it is primarily the top tube 21 and the support tubes 29 which support the head tube 5 and the front end of the motorcycle 1. In other words, the top tube 21 is actually a cantilevered member extending from a transverse rear support 47 on the rear portion of the frame 3 to support the head tube 5 without the benefit of any direct vertical support at the intersection of the head tube 5 and top tube 21 as is conventionally achieved using the down tube.

It is also possible to potentially reverse the arrangement of the top tube 21 and support tubes 29. The support tubes 29 could be formed in such a manner to attach to the transverse rear support 47 and the rear portion of the frame 3, and the top tube 21 could be bent or formed so as be supported by the lower frame rails 33. In either event, as previously discussed, one of the unique aspects of the presently disclosed motorcycle frame is the cantilevered nature of the top tube 21 and support tubes 29 so that the frame 3 does not include a down tube. This design leads to a distinctly different and unique appearance of the frame 3 and motorcycle 1 where the engine mount 43 floats the engine E underneath the top tube 21 without a down tube. This lack of a down tube incurs the need to arrange the cantilevered top tube 21 and support tubes 29 of the frame 3 in a manner so as to completely assume the live load of the motorcycle 1 between the front wheel 8 and rear wheel 13.

Figure 4:
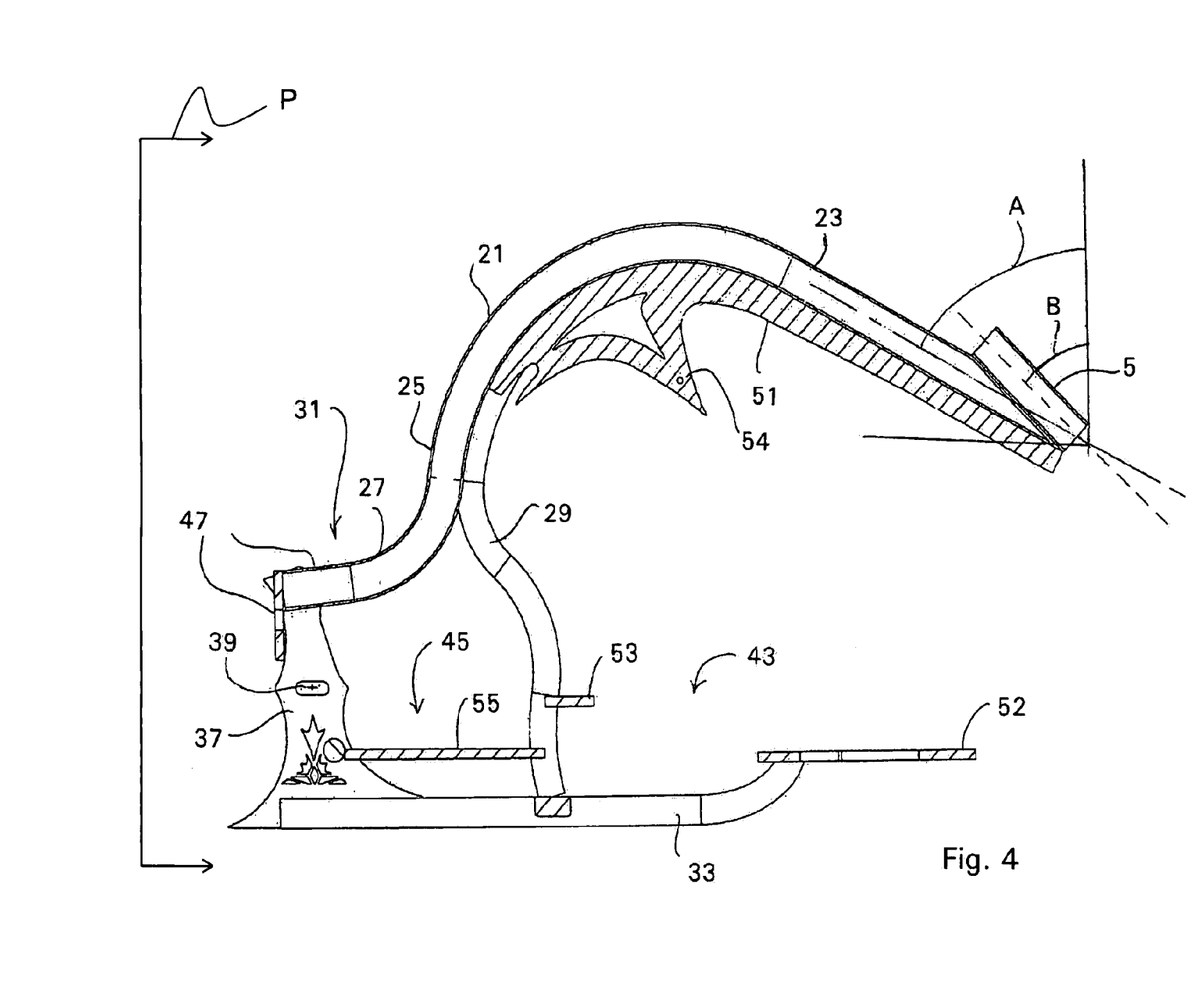
FIG. 4 is a cut-away side elevational view along a central plane P of the frame constructed in accordance with a preferred embodiment of the invention.

Observing FIG. 4, moving rearwardly from the head tube 5, i.e., right to left in the drawing, the top and support tubes 21, 29 are raked rearwardly and upwardly from the connection with the head tube 5, and relative to the vertical, at approximately a 30°-90° angle A and preferably in the range of 50°-70°. It is to be appreciated that the top tube 21 could be raked at an angle close to or even higher than 90° in certain cases as well. The angle B of the head tube 5 relative to the vertical is similarly positioned in a range of about 30°-90° and more preferably in the range of about 50°-60°.

Thus, generally from the intersection with the head tube 5, the top tube 21 and support tubes 29 arc upwardly and rearwardly to a highest crown point vertically higher than the intersection of the top tube 21 and head tube 5, before turning downwardly and diverging to attach to the respective portions of the rear portion 27 of the frame 3 and the lower frame rails 33, as discussed in further detail below. In the case of an embodiment where the top tube is raked over 90°, the above arc description would, of course, be modified so that the crown point was equal to or perhaps even lower than the intersection of the top tube 21 and head tube 5. No matter what the raked angle of the top tube 21 and support tubes 29, the above discussed frame components 3 are still essentially cantilevered forwardly over the engine mount 43 to support the head tube 5 without benefit of a down tube.

The lower portion of the frame 3 comprises a pair of oppositely disposed bottom rails 33 essentially supporting the top tube 21 and support tubes 29 either directly or indirectly. The bottom rails 33 and lower portion of the frame 3 may also be formed from tubular steel, steel alloy or aluminum alloy stock to provide high strength and low weight. The rear portion of the frame 3 also serves to provide the rear swing arm support 35 for the rear swing arm 11. The rear swing arm support 35 is defined by a pair of side brackets 37 having an aperture therethrough defining a swing arm pivot axis 39. As will be discussed in further detail below, the swing arm 11 is provided with a swing arm axle 41 which is supported by the brackets 37 along the swing arm pivot axis 39 about which the rear swing arm assembly 11 rotates.

The bottom rails 33, which are generally the lowest most portion of the frame 3 relative to the ground, extend longitudinally and relatively parallel to the ground surface, from an area in front of the connection with the support tubes 29. This area in front of the support tubes 29 defines a motor mount 43 where the engine is positioned. An area rearward of the support tubes 29 defines a transmission mount 45, and finally at the rear portion of the frame the bottom rails 33 are indirectly connected to the top tube 21 by the respective side brackets 37. The two side brackets 37 extend from the respective opposite bottom rails 33 perpendicularly upwards with the apertures therein defining the rear swing arm pivot axis 39 about which the rear swing arm 11 rotates.

The pair of side brackets 37 are connected at the top by a transverse rear support 47 extending from one side bracket to the other transverse of the longitudinal axis of the frame assembly 3 and at a desired height above the bottom rails 33. The rear portion 27 of the S-shaped top tube 21 is then connected directly to one side of the transverse rear support 47 to substantially define the drop seat position 31 for the motorcycle rider to sit when mounted on the motorcycle 1. A pair of seat rails 49 may be provided which depend from either the top tube 21 or the support tubes 29 and spread away from the top tube 21, substantially following the rearward arc of the rear portion 27 of top tube 21 and are thus at a similar height above the bottom rails 33 as the rear portion 27 of the top tube 21. The ends of these seat rails 49 similarly attach to the transverse rear support 47 and the side brackets 37 and assist in defining the drop seat position 31.

It should be noted that in the above described construction, the top tube 21 and support tube 29 connect to the respectively described lower frame portion components at only one end thereof and that no component, tube or device connects the head tube 5 and front portion of the top tube 21 or the support tubes 29 to the lower portion of the frame 3. This means that the frame assembly 3 has no down tube as is conventionally employed with motorcycle frames. The frame 3, as described above with no down tube, and an S-shaped cantilevered top tube 21 rendering the only support of the head tube 5 may be further described in this regard as a single arm, open loop frame, which provides no other down tube support for either the head tube 5, nor the floating motor mount 43 of the present invention. In other words, a closed loop frame, as known in the art, includes a down tube extending from about the head tube 5 to connect with the engine or another lower portion of the frame 3 so as to circumferentially enclose or surround the motorcycle engine. The open loop frame of the present invention only partially circumferentially surrounds the engine.

As seen in FIGS. 3 and 4, in order to provide further support to the cantilevered top tube 21 and support tubes 29, a support web 51 may be situated between or next to the support tubes 29 and underneath the top tube 21. The support web 51 is connected to and extends partially along the underside of the top tube 21. The support web 51 may extend partially along the underside of the top tube 21 and may, as shown, extend all the way to the head tube 5. The support web 51 and cross-section provides a further significant amount of vertical and torsional rigidity in the area of highest stress on the frame assembly 3 in order to compensate for the lack of a traditional down tube. Generally the support web 51 thickness is in the range of 0.25-0.75 of an inch and preferably about 0.5 of an inch.

Turning to the cross-section of the frame assembly in FIG. 3, the support tubes 29 are generally of a smaller diameter than the top tube 21, although it is to be appreciated that the support and top tubes 29, 21 could also be of a similar size or only a single support tube 29 could be utilized. The support tubes 29 could be of any relative inner and outer diameters, depending on a number of factors, for instance the thickness of the tube walls, the overall weight of the motorcycle and rider, the length of the forward portion of the top tube, etc.

As shown in FIG. 4, the support tubes 29 diverge from their support in connection with the top tube 21 at the intermediate transition portion 25 and extend downwardly to engage a transverse support bar attached between the bottom rails 33 of the motorcycle frame 3. A lower portion of the support tubes 29 may include a motor support bracket 53 for supporting the engine E in the motor mount 43 position as defined between the forward portion of the bottom rails 33 and the support tubes 29 themselves. The motor mount 43 may consist of a front mount 52 as well as the motor support bracket 53. The motor mount 43 may further include an upper mounting point 54 formed in the support web 51.

The divergence of the top tube 21 from the support tubes 29 also defines the transmission mount 45 therebetween whereby the transmission mount 45 includes a plate 55 attached to the support tubes 29 rearwardly of the engine/motor. The plate 55 extends to an attachment with the side brackets 37. The plate 55 can generally be arranged and attached to any respective frame components so that the transmission can be adequately positioned for corresponding connection with the motorcycle engine and rear wheel 13.

The rear portion 27 of the top tube 21 extends rearwardly after separating from the support tubes 29 and defines the drop seat position 31 for the motorcycle seat upon which a rider would sit and operate the motorcycle 1. The drop seat position 31 of the present invention is unique in that the contiguous S-shaped top tube structure of the present invention defines a radical change in radius of curvature and vertical height between the front portion and the rear portion thereof to define the drop seat frame. A drop seat generally means that the seat height is dropped substantially down very near to the bottom rails 33 which are the lowermost frame point of the motorcycle 1. The drop seat is defined by a distance between the top tube 21 and the bottom rails 33. This distance between the bottom rails 33 and the top tube 21 defining the seat position and the bottom rail 33 can be in a range of about 12 inches to 4 inches and more preferably approximately 7 inches thereby placing the drop seat position particularly close to the bottom rails 33 of the motorcycle 1.

Also of importance in the present invention is the relative height difference between the front portion 23 of the frame 3 and the rear portion 27, i.e., the drop seat height, of the frame. In order to provide the above described drop seat of the described dimensions, the radius of curvature of the transition portion 25 between the front and rear portions, 23, 27 of the top tube 21 must be sufficient to accommodate the engine E. Such a radius of curvature creates a significant vertical difference between the highest point of the top tube, generally the crown, and the lowest point of the top tube defining the drop seat. This vertical difference is generally in the range of about 1-3 feet, but more preferably in the range of about 1.5 feet.

Turning to FIGS. 5-8, a discussion of two different embodiments for a rear swing arm 11, and its attachment to the motorcycle frame assembly 3, is provided. The present invention contemplates the use of two different types of swing arms, a single swing arm 61, as in FIG. 5, and a conventional double swing arm 81, shown in FIG. 7. The frame assembly 3, described above, may be utilized with either embodiment. For purposes of clarity, the single swing arm 61 will be initially described.

Figure 5A:
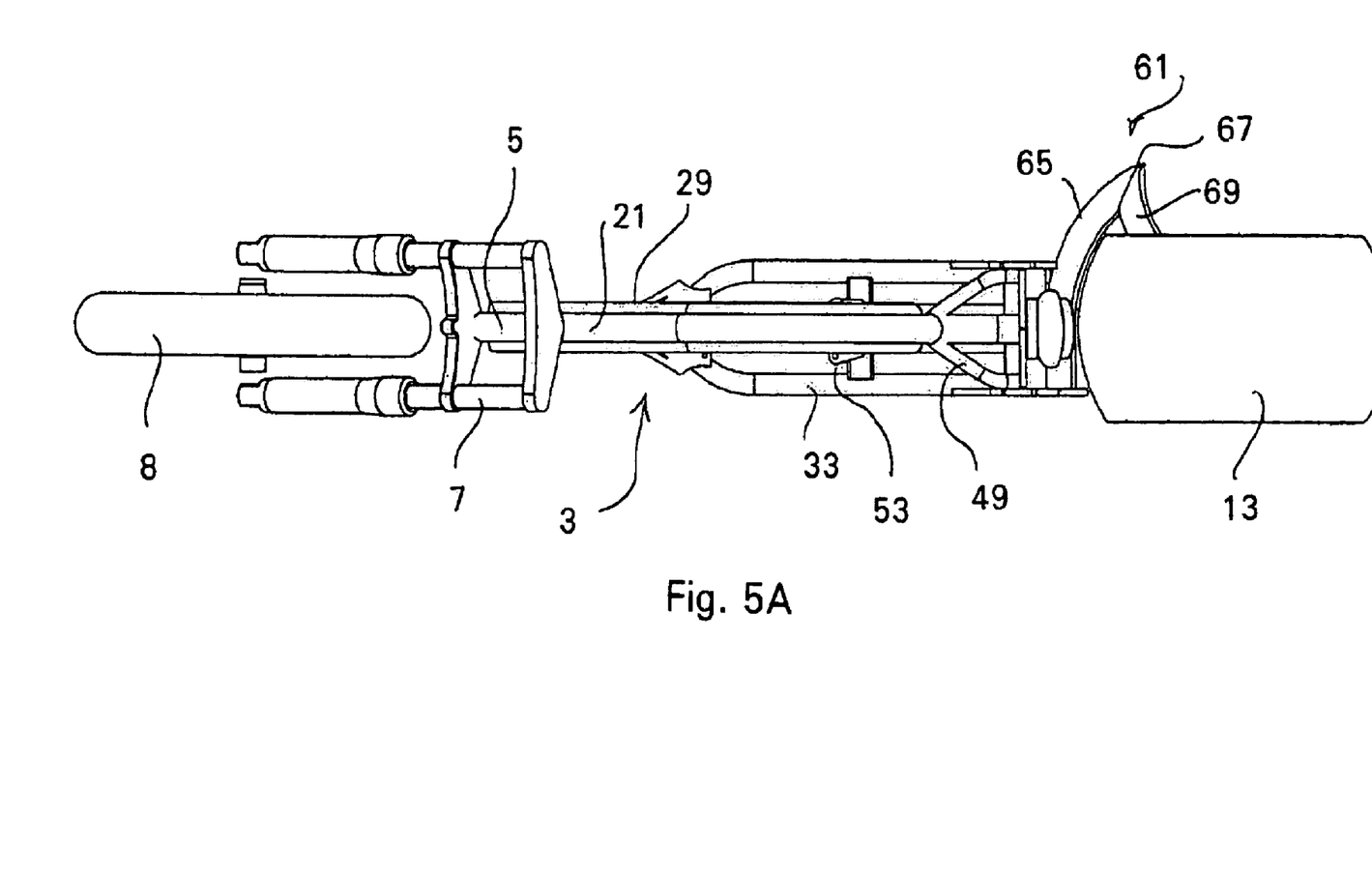
FIG. 5A is a top plan view of the motorcycle frame and a single arm swing arm.
Figure 5B:
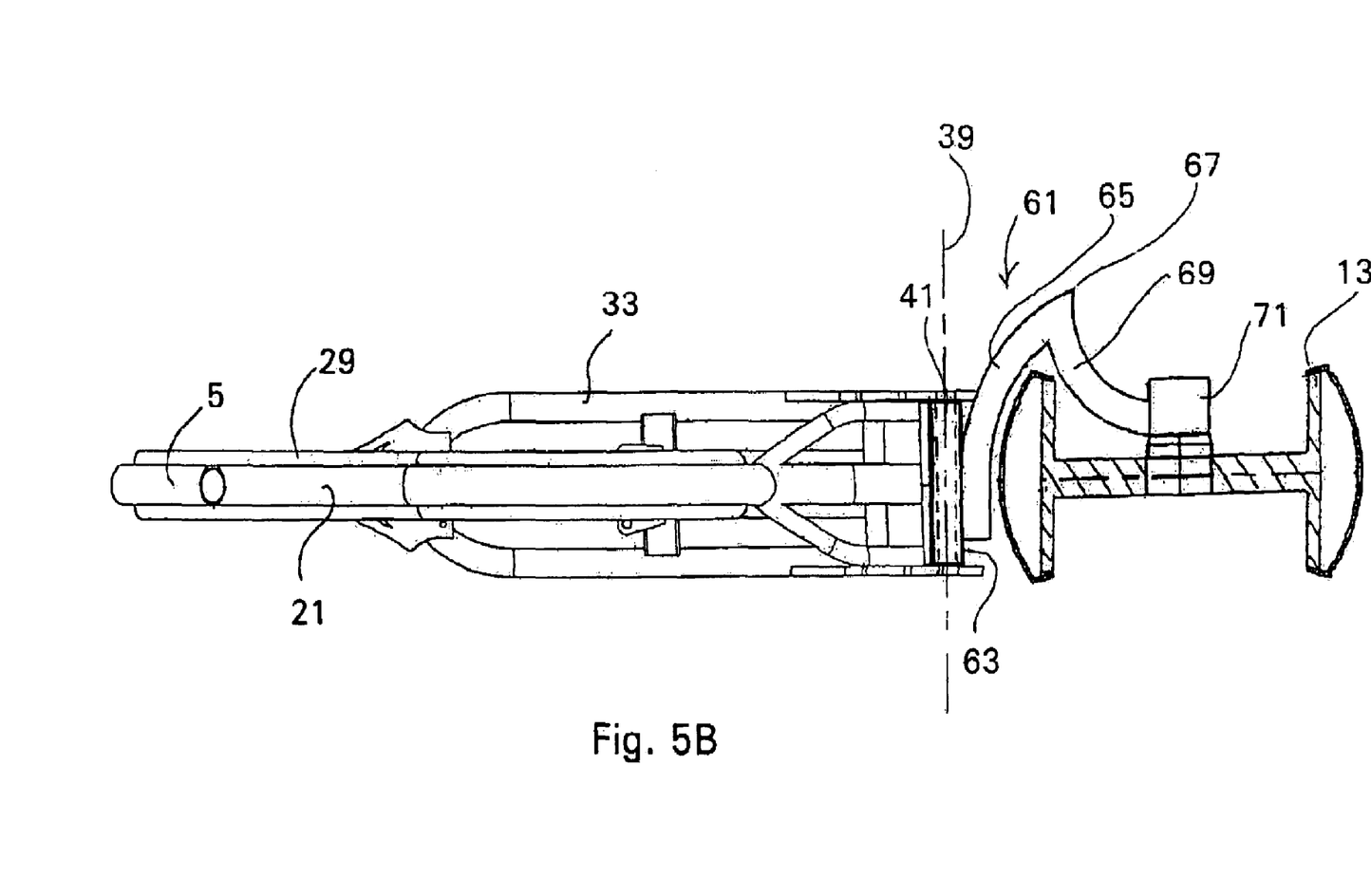
FIG. 5B is a top plan view of the motorcycle frame and a single arm swing arm in partial cross-section.
Figure 6A:
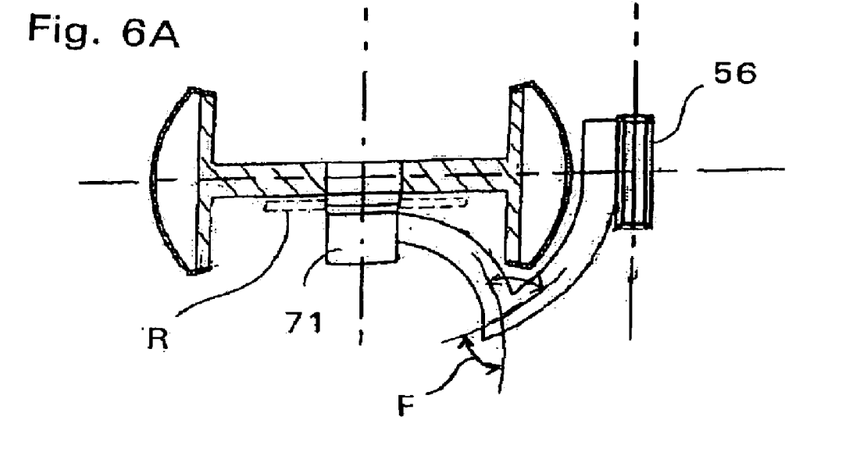
FIG. 6A is a top plan view of the single arm swing arm and a rear wheel.
Figure 6B:
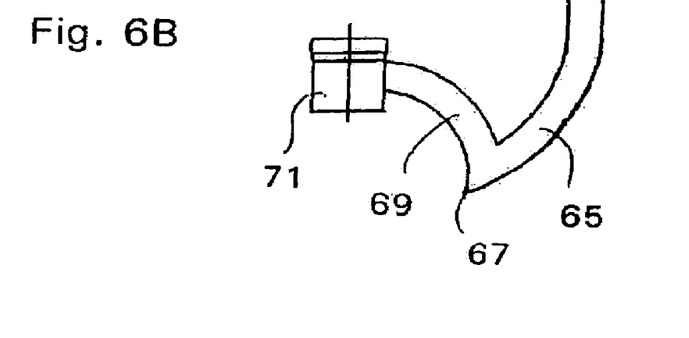
FIG. 6B is a top plan view of only the single arm swing arm.
Figure 6C:
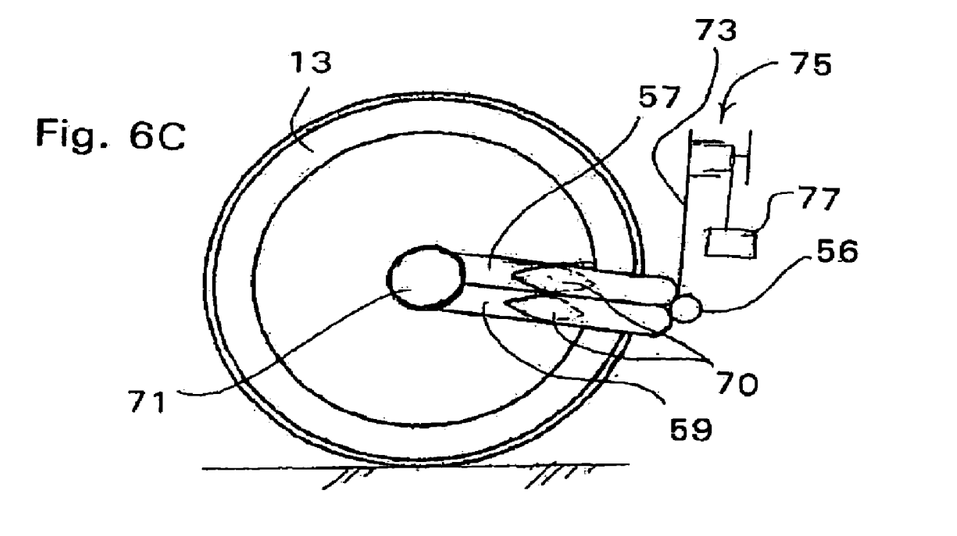
FIG. 6C is a side elevational view of the single arm swing arm and rear wheel.

The single arm swing arm 61, as shown in FIGS. 5A, B and 6A-6C comprises an upper tube 57 and a lower tube 59 welded substantially directly one above the other, i.e., stacked, and situated generally vertically parallel to one another, best seen in FIG. 6C. Each of the stacked tubes 57, 59 is a steel or alloy tube having an outside diameter of about 2 inches. This outer diameter is important because, if the tubes are provided with a much larger diameter as those of skill in the art can appreciate, it becomes difficult to accommodate a brake rotor R in the wheel assembly. Thus, in order to provide sufficient vertical and torsional strength to the single swing arm 61, the tubes 57, 59 are stacked vertically one above the other and attached, generally by welding.

The single arm swing arm 61 has a rotatable connection 63, hinge or bearing which connects to the swing arm axle 41 along the rear swing arm pivot 39 defined by the frame 3. As seen in FIG. 6C, the rotatable connection 63 may be a bearing tube 56 connected or welded to the at least one of the upper and lower swing arm tubes 57, 59. The bearing tube 56 is generally attached to the swing arm and is supported along the swing arm pivot axis 39 by the swing arm axle 41 and thus the swing arm 61 is able to pivot about the swing arm axle 41 relative to the frame 3. As such rotatable connections are well known in the art, no further discussion is herein provided.

As seen in FIGS. 5A, B, from the rotatable connection 63, the single arm swing arm 61 extends essentially laterally outward from only one side of the motorcycle frame 3. The single arm swing arm 61 is thus provided initially with a rearward and outward curve portion 65 in a manner substantially matching that of the tire profile. At an apex point 67 spaced from the frame 3 and from the respective side of the rear tire, the rearward and outward curve portion 65 of the swing arm terminates and a rearward and inward curve portion 69 of the swing arm extends to a hub support 71 for connecting with the hub of the rear wheel 13 of the motorcycle 1. The rearward and inward curve portion 69 of the swing arm and the rearward and outward curve portion 65 intersect with one another to define the apex 67 of the swing arm at a point of transversely intersecting arcs as defined by the respectively curved portions 65, 69 of the single arm swing arm 61.

The rearward and inward curve portion 69 must be sized and arranged so as to provide room for the rotor R of a disk brake mounted on the rear wheel 13 as well as the low profile tire and rim as shown in FIG. 6A. In general, tubes having an outside diameter of about 2 inches provide sufficient strength and space to achieve this application. The transversely intersecting curved portions 65, 69 of the swing arm 61 may be generally fabricated by welding the ends of two separate bent tube sections to one another to form either of the upper and lower tubes 57, 59. The upper and lower tubes are then stacked and attached to one another along their lengths to form the single arm swing arm 61. It may be possible to bend a tube into such a configuration, but such an arrangement can usually not be easily accomplished merely by bending a single piece of stock as such a bend encompasses bending the stock up to or past an angle of 90° which will compromise the integrity and material strength of the tube stock.

In addition, where the two curve portions forming the transversely intersecting arcs intersect at an angle to form the apex 67 of the arm, the junction of the ends of the sections forms an ellipse 70, as seen in FIG. 6C, which provides an increased area for a weld between the curve portions 65, 69 and thus an increased lateral, i.e., side-to-side, strength of the rear swing arm where the ellipse 70 define a plane essentially transversely arranged relative to the longitudinal axis of the motorcycle 1. It is also to be appreciated that the single arm swing arm 61 could utilize straight tube portions which are bent or cut to form the apex of the swing arm and then stacked on top of another similarly to the shown joined tubes 57, 59. In any event, the apex 67 of the swing arm could be formed at any desired angle but, in general, is an angle F which facilitates the swing arm 61 remaining close to the rear tire. This angle F, between the two curve portions, is approximately slightly less than a 90° angle in FIGS. 6A and 6B.

Figure 7:
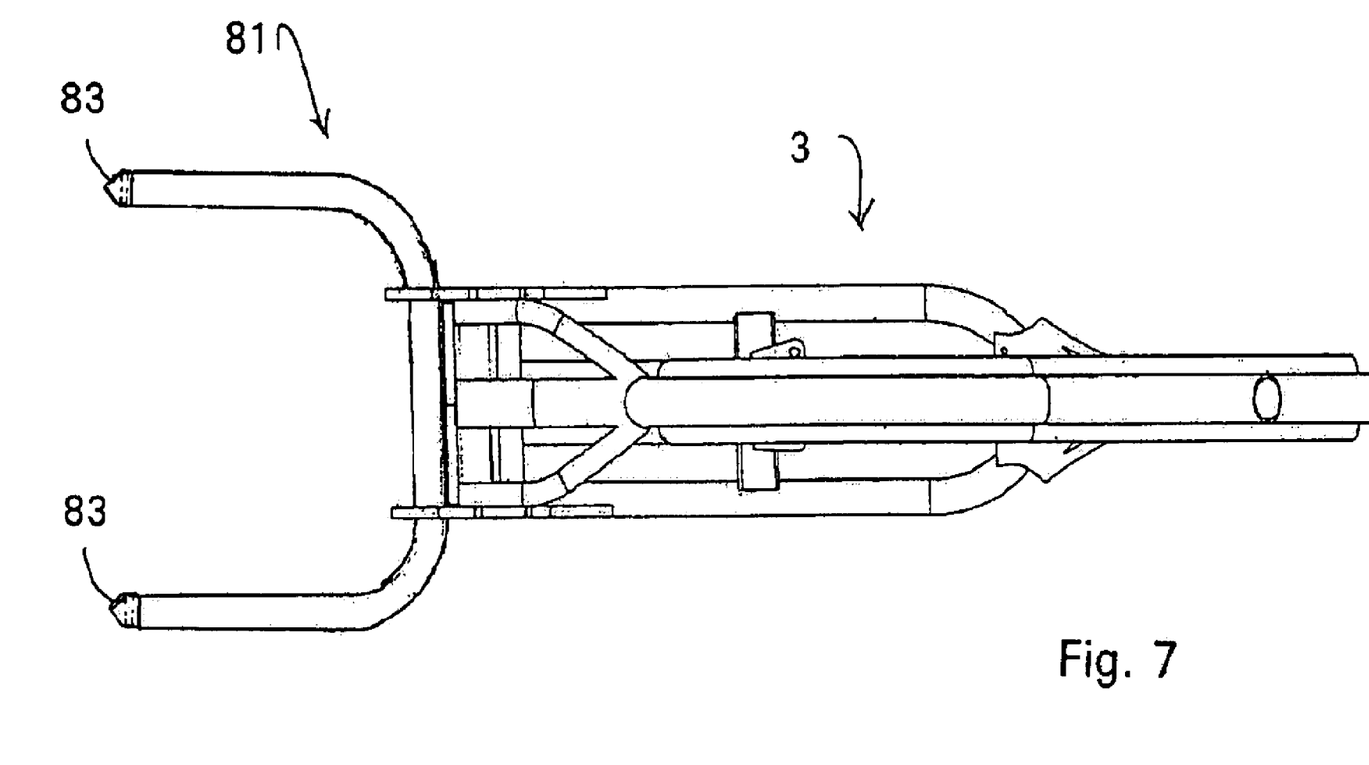
FIG. 7 is a top plan view of the double arm swing arm and the frame assembly.

In another embodiment of the rear swing arm 11, a double arm swing arm 81 as shown in FIG. 7 comprises a connection to the rear swing arm axle 41, similar to that as described above, but double arm swing arm has a pair of parallel arms supported by the rear swing arm axle 41 and extending outwardly and rearwardly therefrom on both sides of the rear tire (not shown) in the shape of a U as is conventionally known.

Figure 8A:
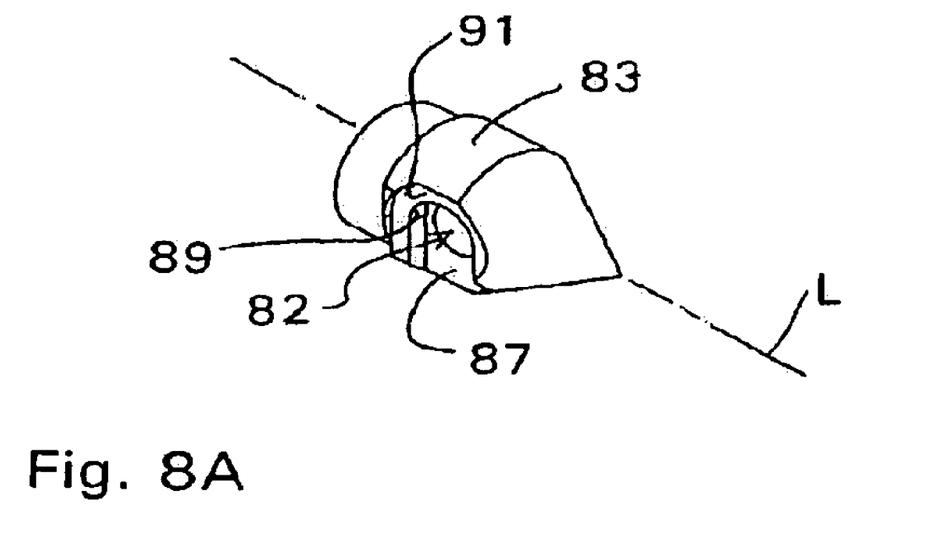
FIG. 8A-E are alternative views of the rear axle mount which supports the rear wheel axle of the motorcycle.
Figure 8B:
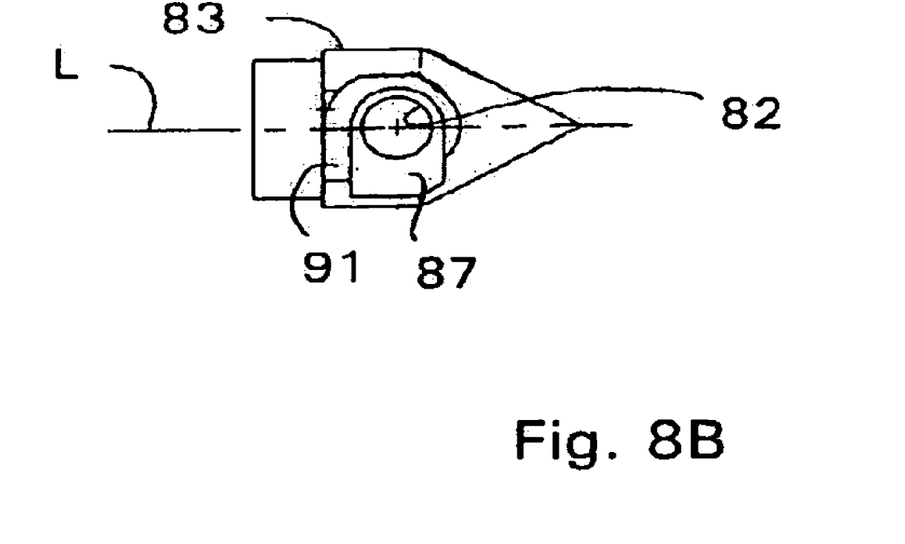
Figure 8C:
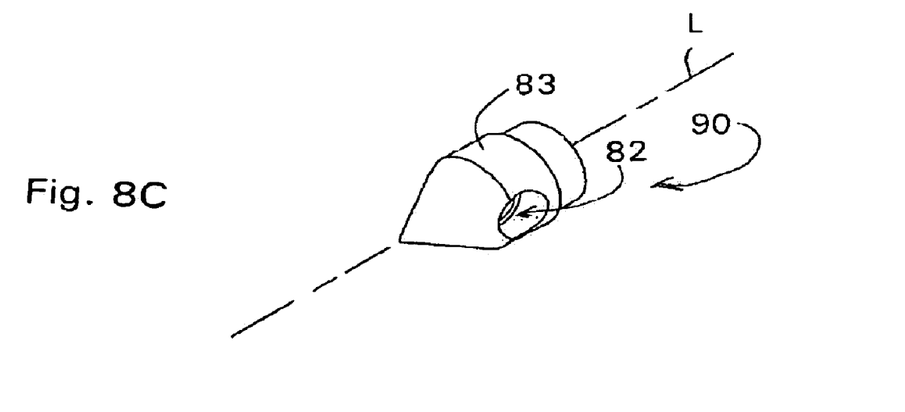
Figure 8D:
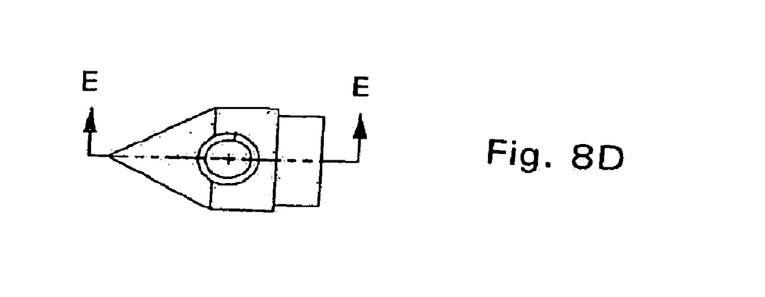
Figure 8E:
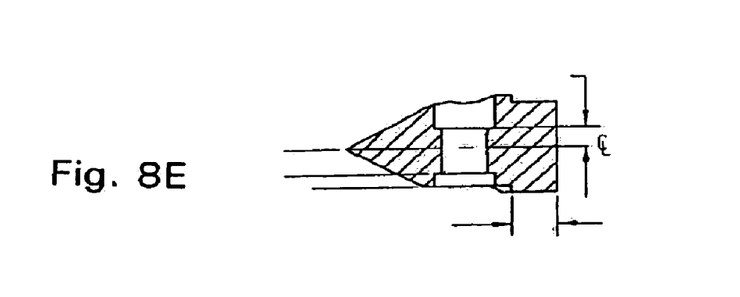

A pair of rear axles supports 83 are provided to be attached, generally welded, to the ends of the U-shaped swing arms. As seen in FIGS. 8A-E, the rear axle supports 83 comprise an aperture 82 perpendicular through the longitudinal axis L of the axle support 83. On an inward facing side as seen in FIGS. 8A-B, i.e., the side of the support facing the tire, a first relief area 87 is formed which has a diameter slightly larger than the aperture 82 and provides a contiguous side and upper edge 89 against which the axle for the rear Wheel may abuts. The bottom of the first relief area 87 is open, i.e., there is no bottom edge, so that the axle may be slid upwards and directly into the relief area 87 against the sides and upper edge 89 of the relief 87. A second relief area 91 may be provided relative to the first relief area 87 and the outer surface of the support 83 to accommodate a spacer or similar part of the rear wheel assembly.

When both axle supports 83 are provided on either side of the double swing arm 81, it is readily apparent to those of skill in the art that an entire rear wheel assembly including the rotors, spacers, axle, tire, rim, etc., may as one assembly be slid directly into contact and connection with the rear axle supports 83. A bolt (not shown) may then be inserted through the apertures 82 of each of the axle supports 83 from the outward facing side 90 of the support 83 to engage with the rear wheel axle and secure the rear wheel assembly to the rear swing arm 11.

This arrangement eliminates the necessity, as is traditionally done in the motorcycle assembly process for the rear wheel of a motorcycle, to thread the rear axle through holes drilled in one rear swing arm 11, and then individually through each of the components, e.g., the sprocket, hub, rotor etc., which make up the rear wheel assembly and, finally through the other arm of the double swing arm 81. With the present invention, the manufacturer may put the whole wheel assembly together, including mounting the axle, spacers, rotor, sprocket, etc., and any other rear wheel assembly components directly on the axle, and then merely insert the rear axle and wheel assembly upwardly into the first relief area 87 in each of the rear axle supports 83. The ends of the rear axle, which generally have countersunk threads in an aperture on each end, are then engaged by the bolts through the respective rear axle supports 83.

Figure 10A:
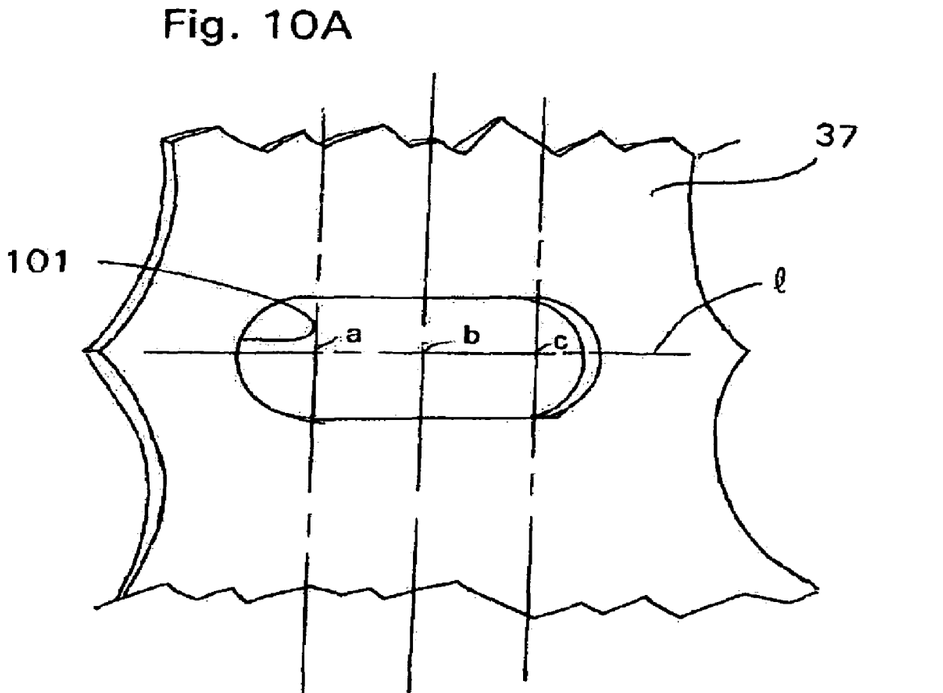
FIGS. 10A-10B are a rear swing arm length adjustment assembly.
Figure 10B:
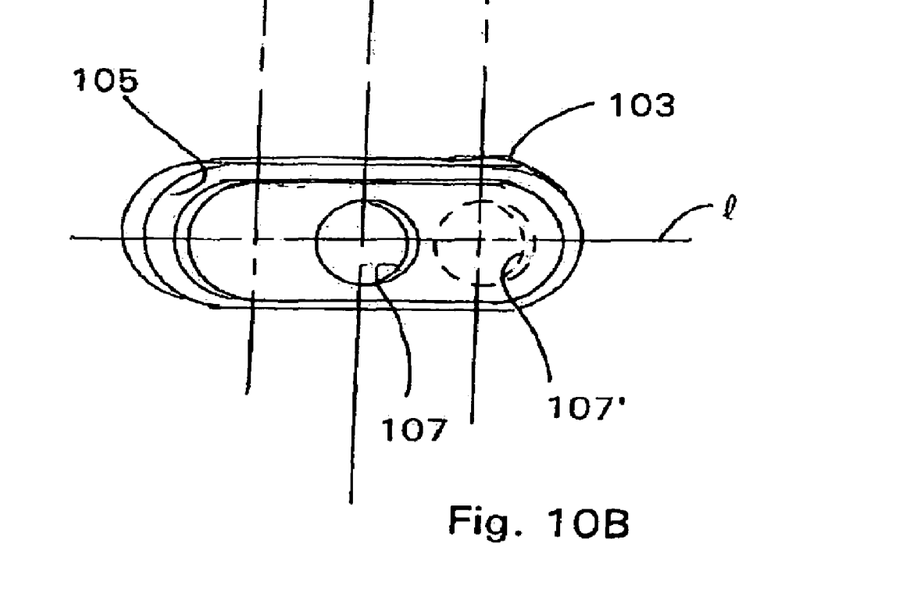

Finally, it should be noted that the relative rotatable movement of either of the swing arms, relative to the frame, can be damped by a shock absorber 75 on an extension 73 connected to the rear swing arm 11 as shown diagrammatically in FIG. 6C and also in FIG. 10. The extension 73 may extend upward from a point on the swing arm substantially adjacent the rotatable connection 63 to a point spaced from the transverse rear support on the frame 3. A shock absorber or damping element 75 of some sort is sandwiched between the transverse rear support 47 and the extension 73, and thus can control and/or cushion the relative movement of either of the swing arm embodiments between the frame assembly 3 and the ground. A stopper 70 is provided below the level of the hinge axis 39 to ensure that the shock absorber does not over extend the angular relation of the rear swing arm to the frame 3. In a preferred embodiment of the present invention, an pneumatically adjustable, air damped shock absorber 75 is placed between the frame 3 and the swing arm.

Figure 9:
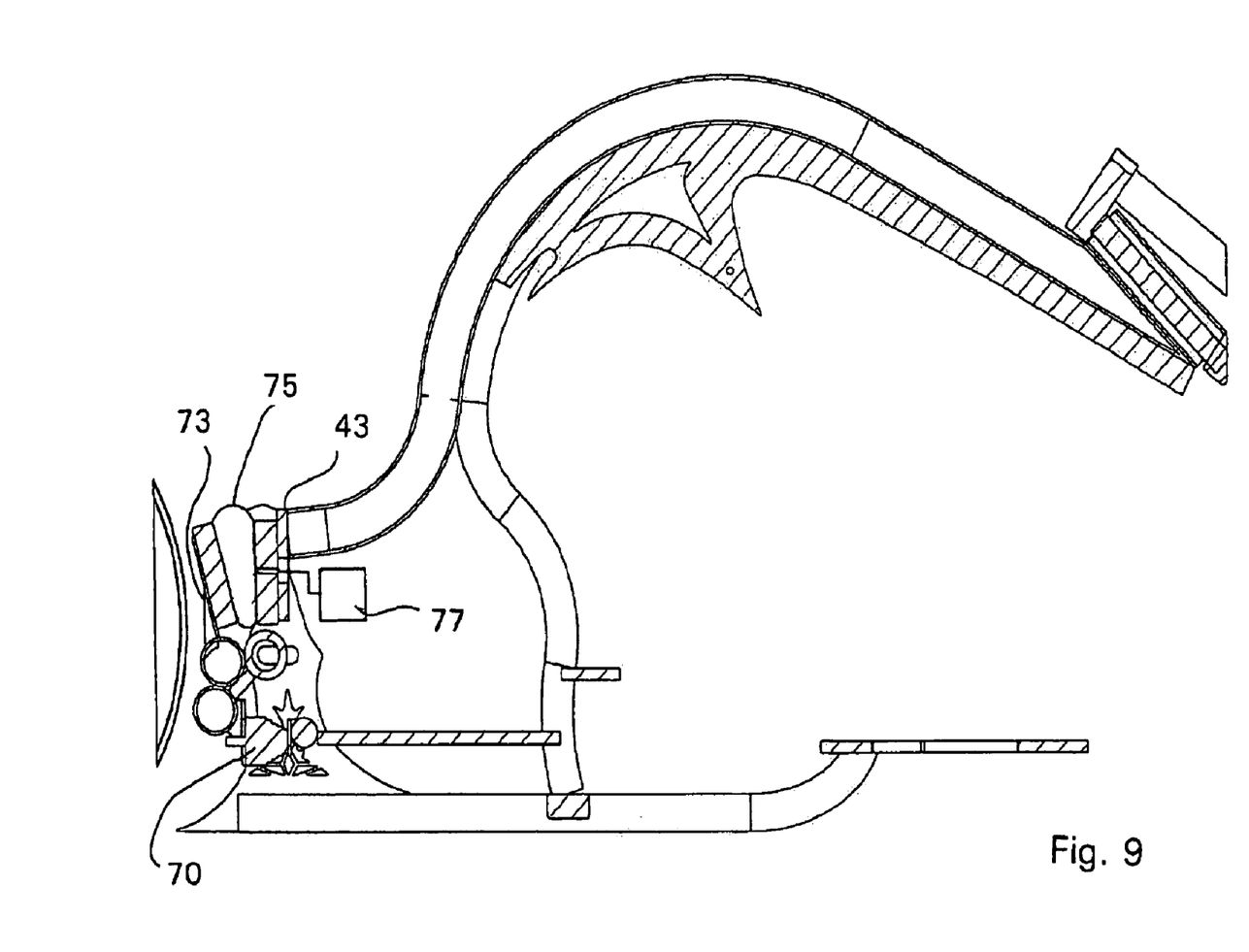
FIG. 9 is a cross-section and diagrammatic view of the rear shock absorber and pneumatic adjustment system.

The air damped, shock absorber 75 is a variable air dampening system which is regulated by control of a pneumatic pump 77 mounted to the frame 3 or the rear swing arm to inflate or deflate an air bladder of the shock absorber 75. This variable control over the shock absorber 75 performs two functions, first, regulation of air pressure in the bladder of the shock absorber 75 shortens and lengthens the shock absorber so as to determine the angular orientation of the rear swing arm 11 relative to the frame 3 and, secondly, the total air pressure in the bladder determines the shock absorption capability of the motorcycle suspension, more air pressure stiffer ride, less air pressure, softer ride.

Turning to FIGS. 10A, B, the swing arm pivot axis for either of the above described embodiments may be constructed in a manner so as to be longitudinally variable relative to the frame 3 in the aforementioned aperture. A variable swing arm pivot axis would allow one to easily vary the distance of the rear wheel axle from the frame 3 without regard to the relative connection and support between the rear wheel axle and the rear swing axis. This is an important feature of the present invention since as is well known in the art it is critical to be able to quickly and easily adjust this distance to accommodate for slight differences in chain or belt lengths between the transmission and the drive sprocket of the rear wheel. Such a device in very important where the swing arm has essentially a fixed length as in the above described single arm and double arm swing arms.

The swing arm pivot axis 39 is moveable within a range defined by a longitudinally elongate aperture or hole 101 in each of the side brackets 37. For each of the elongate holes 101 in the respective side brackets a circumferentially matching eccentric adjuster 103 is provided to be inserted and supported in the hole 101. A face portion 105 of the adjuster 103 has a larger outer circumference than that of the elongate hole so the adjuster cannot be forced through the hole when matchingly aligned. The eccentric adjuster 103 is provided with a throughbore 107 at some location along the longitudinal length l of the plug which permits a bolt to be passed therethrough and connected to the swing arm axle. With eccentric adjusters 103 having matchingly aligned throughbores 107 situated in the respective holes 101 of the opposing side brackets 37 parallel across from one another, the swing arm axle 41 can be securely and evenly mounted therebetween.

A number of eccentric adjusters 103 may be provided with through-bores 107 formed in various longitudinal positions along the plug 103 as shown by offset throughbore 107'. It is to be appreciated that in the present design the eccentric adjuster 103 can be rotated 180 degrees and reinserted into the hole 101 so as to position its offset throughbore 107' in a different relative position to the side brackets 37 and frame 3. For example, by providing only two different eccentric adjusters 103, the first having its throughbore in the center of the plug 103 as seen in FIG. 10B, and a second having a throughbore 107 offset from the center as shown in dashed lines in FIG. 10B, at least three different relative positions of the swing arm axle 41 are provided where the second eccentric adjuster 103 can be taken out of the hole 101 and rotated 180 degrees to change the relative position of the offset throughbore 107' in the hole 101.

Where the above noted throughbores 107 are drilled in the respective eccentric adjuster 103, one-half inch apart, with only the above two described eccentric adjusters 103 (for each opposing side bracket) the swing arm can be attached to the frame in 3 different relative longitudinal positions a, b and c, each position being spaced about one-half inch apart, although other distances are certainly possible. The nature of such easily replaceable eccentric adjusters 103 makes adjustment of the rear swing arm particularly easy without significant disassembly of the rear swing arm and frame components.

Since certain changes may be made in the above described improved reward dispensing mechanism, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A motorcycle frame comprising:
   a head tube for pivotally supporting a front wheel, fork and steering assembly;
   a contiguous top tube having a forward portion extending rearward from the head tube to a rearward portion of the top tube which curves downwardly and rearwardly to define a seat position for a rider; and
   a support member connected to the head tube and the forward portion of the top tube; and
   the support member is connected in a parallel and concentric relationship with at least the forward portion of the top tube; and
   wherein the top tube extends rearwardly and upwardly along a central plane of the motorcycle frame from a connection with the head tube to a highest crown point of the frame before curving downwardly and rearwardly to define the seat position for the rider.

2. The motorcycle frame as set forth in claim 1, wherein the support member separates from the rear portion of the top tube and connects to a lower portion of the motorcycle frame.

3. The motorcycle frame as set forth in claim 1, wherein the contiguous top tube is S-shaped and extends contiguously from the head tube to a rear-most portion of the motorcycle frame.

4. The motorcycle frame as set forth in claim 1, wherein the support member is a support tube attached to an inner radius of the top tube along at least the forward portion of the top tube.

5. The motorcycle frame as set forth in claim 1, wherein the head tube is attached solely to the support member and the top tube.

6. The motorcycle frame as set forth in claim 5, further comprising a lower frame portion wherein the support member and the top tube are cantilevered over an engine mount area from respective connection points with the lower frame portion spaced rearwardly on the lower portion of the frame from the engine mount area.

7. The motorcycle frame as set forth in claim 6, wherein the engine mount area comprises a substantially horizontal and lower most frame section extending forwardly of the support member and top tube connection points to support an engine E beneath the top tube.

8. The motorcycle frame as set forth in claim 7, wherein the top tube, support member and lower most frame section form an open loop where no down tube is connected to either the head tube, the forward portion of the top tube, or the engine mount area.

9. A motorcycle frame comprising:
   a head tube;
   a top tube;
   a top tube support arranged parallel with the top tube;
   a lower frame section;
   the sole support of the head tube is provided by the top tube and top tube support; and
   wherein the top tube and top tube support comprise an upward and rearward arc from a connection point with the head tube.

10. The motorcycle frame as set forth in claim 9, wherein one of the top tube and the top tube support further comprises a downward and rearward arc defining a seat position of the motorcycle frame.

11. The motorcycle frame as set forth in claim 10, wherein the top tube and the top tube support diverge from one another and connect to the lower frame section at horizontally spaced apart connection points.

12. The motorcycle frame as set forth in claim 11, wherein the divergence of the top tube and top tube support from one another defines a transmission mount area therebetween.

13. The motorcycle frame as set forth in claim 9, further comprising a single arm swing arm being rotatably attached to the lower section of the frame.

14. The motorcycle frame as set forth in claim 13, wherein the single arm swing arm comprises a rearward and outwardly curved portion and a rearwardly and inwardly curved portion to connect with a hub of a rear wheel.

15. The motorcycle frame as set forth in claim 14, wherein the single arm swing arm further comprises an apex portion wherein the rearward and outwardly curved portion and the rearwardly and inwardly curved portion transversely intersect one another.

* * * * *